United States Patent
Pan

(10) Patent No.: US 7,538,932 B2
(45) Date of Patent: *May 26, 2009

(54) HIGH CONTRAST SPATIAL LIGHT MODULATOR

(75) Inventor: Shaoher X. Pan, San Jose, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/776,422

(22) Filed: Jul. 11, 2007

(65) Prior Publication Data

US 2008/0013147 A1 Jan. 17, 2008

Related U.S. Application Data

(63) Continuation of application No. 10/974,461, filed on Oct. 25, 2004, now Pat. No. 7,245,415.

(60) Provisional application No. 60/513,327, filed on Oct. 23, 2003.

(51) Int. Cl.
  *G02B 26/00* (2006.01)
(52) U.S. Cl. ..................... 359/291
(58) Field of Classification Search ............... 359/290, 359/291, 292, 293, 295, 298, 223, 224, 320, 359/332

See application file for complete search history.

(56) References Cited

U.S. PATENT DOCUMENTS

| | | | |
|---|---|---|---|
| 6,469,821 B2 | 10/2002 | Bartlett et al. | |
| 6,487,001 B2 | 11/2002 | Greywall | |
| 6,819,470 B2 | 11/2004 | Meier et al. | |
| 6,856,068 B2 | 2/2005 | Miller et al. | |
| 6,870,659 B2 | 3/2005 | Aubuchon | |
| 6,880,936 B2 | 4/2005 | Shin | |
| 6,914,711 B2 | 7/2005 | Novotney et al. | |
| 6,992,810 B2 | 1/2006 | Pan et al. | |
| 7,034,984 B2 * | 4/2006 | Pan et al. | 359/291 |
| 7,095,546 B2 * | 8/2006 | Mala et al. | 359/290 |
| 7,148,603 B1 | 12/2006 | Garcia et al. | |
| 7,167,298 B2 | 1/2007 | Pan | |
| 7,245,415 B2 | 7/2007 | Pan | |
| 2004/0240033 A1 | 12/2004 | Pan et al. | |
| 2005/0128564 A1 | 6/2005 | Pan | |

OTHER PUBLICATIONS

Shaoher X. Pan, "High Fill-Ratio Mirror-Based Spatial Light Modulator", U.S. Appl. No. 11/467,367, filed Aug. 25, 2006, 21 pp.

* cited by examiner

*Primary Examiner*—Hung X Dang
*Assistant Examiner*—Tuyen Q Tra
(74) *Attorney, Agent, or Firm*—Fish & Richardson P.C.

(57) ABSTRACT

A high contrast spatial light modulator for display and printing is fabricated by coupling a high active reflection area fill-ratio and non-diffractive micro mirror array with a high electrostatic efficiency and low surface adhesion control substrate.

16 Claims, 12 Drawing Sheets

HIGH CONTRAST SPATIAL LIGHT MODULATOR

CROSS REFERENCE TO RELATED APPLICATIONS

This application is a continuation application and claims the benefit of priority under 35 U.S.C. Section 120 of U.S. application Ser. No. 10/974,461, filed on Oct. 25, 2004, which claims priority to U.S. Provisional Application Ser. No. 60/513,327, filed Oct. 23, 2003. The disclosure of each prior application is considered part of and is incorporated by reference in the disclosure of this application.

FIELD OF THE INVENTION

This invention relates to arrays of spatial light modulators (SLMs) and their operations, and more particularly to a micro mirror array with electronically addressable control circuitry for high contrast display and printing applications.

BACKGROUND OF THE INVENTION

Over the past fifteen to twenty years, micro mirror array based spatial light modulator (SLM) has made many incremental technical progresses and gained great acceptance in the display industry. The devices operate by tilting individual micro mirror plate in the array around a torsion hinge with an electrostatic torque to deflect the incident light to a predetermined exit direction. In a more popular digital mode operation, the directional light is turn "on" or "off" by rotating selectively the individual mirrors in a micro mirror array and mechanically stopped at a specific landing position to ensure the precision of deflection angles. A functional micro mirror array requires low contact sticking forces at the mechanical stops and high efficiency of electrostatic torques to control timing, to overcome surfaces contact adhesions, and to ensure the robotics and reliability. A high performance spatial light modulator for display application produces high brightness and high contrast ratio videos images.

Early SLM in video application suffers a disadvantage of low brightness and low contrast ratio of the images projected. Previous SLM design typically has a low active reflection area fill-ratio of pixels (e.g., ratio between active reflective areas and non-active areas in each pixel). A large inactive area around each pixel in the array of SLM results to a low optical coupling efficiency and low brightness. The scattered light from these inactive areas in the array forms diffraction patterns adversely impact the contrast of video images. Another major sources reducing the contrast ratio of micro mirror array based SLM is the diffraction of the scattered light from two straight edges of each mirror in the array that are perpendicular to the incident illumination. In a traditional square shape mirror design, an orthogonal incident light is scattered directly by the perpendicular straight leading and trailing edges of each mirrors in the array during the operation. The scattered light produces a diffraction pattern and much of the diffracted light is collected by the projection lenses. The bright diffraction pattern smears out the high contrast of projected video images.

One type of micro mirror based SLM is the Digital Mirror Device (DMD), developed by Texas Instruments and described by Hornbeck. The most recent implementations include a micro mirror plate suspended via a rigid vertical support post on top of a yoke plate. The yoke plate is further comprised a pair of torsion hinges and two pair of horizontal landing tips above addressing electrodes. The electrostatic forces on the yoke plate and mirror plate controlled by the voltage potentials on the addressing electrodes cause the bi-directional rotation of both plates. The double plate structure is used to provide an approximately flat mirror surface that covers the underlying circuitry and hinge mechanism, which is one way in order to achieve an acceptable contrast ratio.

However, the vertical mirror support post which elevated the mirror plate above the hinge yoke plate has two negative impacts on the contrast ratio of the DMD. First, a large dimple (caused by the fabrication of mirror support post) is present at the center of the mirror in current designs which causes scattering of the incident light and reduces optical efficiency. Second, the rotation of double plate causes a horizontal displacement of mirror reflective surfaces along the surface of DMD, resulting a horizontal vibration of a micro mirror during operation. The horizontal movement of mirrors requires extra larger gaps to be design in between the mirrors in the array, reducing the active reflection area fill-ratio further. For example, if the rotation of mirror on each direction is 12°, every one micron apart between the mirror and the yoke resulting a 0.2 microns horizontal displacement on each direction. In other words, more than 0.4 microns extra gap spacing between the adjacent mirrors is required for every one micron length of mirror support post to accommodate the horizontal displacement.

The yoke structure has limited the electrostatic efficiency of the capacitive coupling between the bottom electrodes and the yoke and mirror. Especially in a landing position, it requires a high voltage potential bias between the electrodes and the yoke and mirror to enable the angular cross over transition. Double plate structure scatters incident light which also reduces the contrast ratio of the video images.

Another reflective SLM includes an upper optically transmissive substrate held above a lower substrate containing addressing circuitry. One or more electrostatically deflectable elements are suspended by two hinge posts from the upper substrate. In operation, individual mirrors are selectively deflected and serve to spatially modulate light that is incident to, and then reflected back through, the upper transmissive substrate. Motion stops may be attached to the reflective deflectable elements so that the mirror does not snap to the bottom control substrate. Instead, the motion stop rests against the upper transmissive substrate thus limiting the deflection angle of the reflective deflectable elements.

In such top hanging mirror design, the mirror hanging posts and mechanical stops are all exposed to the light of illumination, which reduces the active reflection area fill-ratio and optical efficiency, and increase the light scattering. It is also difficult to control the smoothness of reflective mirror surfaces, which is sandwiched between the deposited aluminum film and LPCVD silicon nitride layers. Deposition film quality determines the roughness of reflective aluminum surfaces. No post-polishing can be done to correct the mirror roughness.

In this invention, a high contrast spatial light modulator for display and printing is fabricated by coupling a high active reflection area fill-ratio and non-diffractive micro mirror array with a high electrostatic efficiency and low surface adhesion control substrate.

SUMMARY OF THE INVENTION

The present invention is a high contrast spatial light modulator comprising a high active reflection area fill-ratio and non-diffractive micro mirror array and a high electrostatic efficiency and low surface adhesion control substrate.

According to another embodiment of the present invention, both the leading and trailing edges of each mirror 102 has at least one or a series of corners to prevent the scattered light from diffracting into the projection pupil 403.

According to another embodiment of the present invention, both the leading and trailing edges of each mirror 102 has at least one or a series of curvatures to prevent the scattered light from diffracting into the projection pupil 403.

According to another embodiment of the present invention, both the leading and trailing edges of each mirror 102 has a corner in the center flanked by two curvatures to prevent the scattered light from diffracting into the projection pupil 403.

According to another embodiment of the present invention, pairs of torsion hinges 106 are embedded under the cavities to be part of the lower portion of a mirror plate 103, and are kept in a minimum distance under the reflective surface to allow only a gap for a pre-determined angular rotation. Each mirror in the array is suspended by a pair of torsion hinges 106 supported by two posts 105, so each mirror rotates along an axis in the mirror plane 103. By eliminating the horizontal displacement of individual mirror during the cross over transition, the gaps between adjacent mirrors in the array are significantly reduced, which results in a very high active reflection area fill-ratio of the SLM.

According to another embodiment of the present invention, a pair of vertical landing tips 222 is fabricated on the surface of control substrate. These vertical landing tips 222 reduce the contact area of mirrors during the mechanical stops, and improve the reliability of mechanical landing operation. Most importantly, these landing tips 222 enable a mirror landing separation by applying a sharp bipolar pulsing voltage on a common bias 303 of mirror array. The kinetic energy of the electromechanical shock generated by bipolar pulsing is converted into the elastic strain energy stored in the deformed mirror hinges 106 and deformed landing tips 222, and released later on to spring and bounce the mirror 103 separating from the landing tips 222.

According to another embodiment of the present invention, the step electrode 221 is raised above the surface of control substrate 300 to narrow the air gap spacing between the mirrors 103 and the addressing electrodes 221 near hinge 106 areas. Smaller effective air gap spacing, especially at a mechanical stop position, enhance the electromechanically latching and improve the electrostatic efficiency greatly.

According to another embodiment of the present invention, the materials of mirror plates, embedded torsion hinges, support frames, support posts are made of polysilicon. Although polysilicon has its physical and chemical properties well suit for the application, other conductive materials such as doped silicon, silicide or polycide, or metals such as aluminum, titanium, tungsten, or molybdenum, their alloys and a combination thereof, are also suitable and desirable in some applications.

BRIEF DESCRIPTION OF THE DRAWINGS

The following drawings, which are incorporated in and from a part of the specification, illustrate embodiments of the present invention and, together with the description, serve to explain the principles of the invention.

DETAILED DESCRIPTION OF THE INVENTION

A high contrast spatial light modulator for display and printing is fabricated by coupling a high active reflection area fill-ratio and non-diffractive micro mirror array with a high electrostatic efficiency and low surface adhesion control substrate.

Figure 1A:
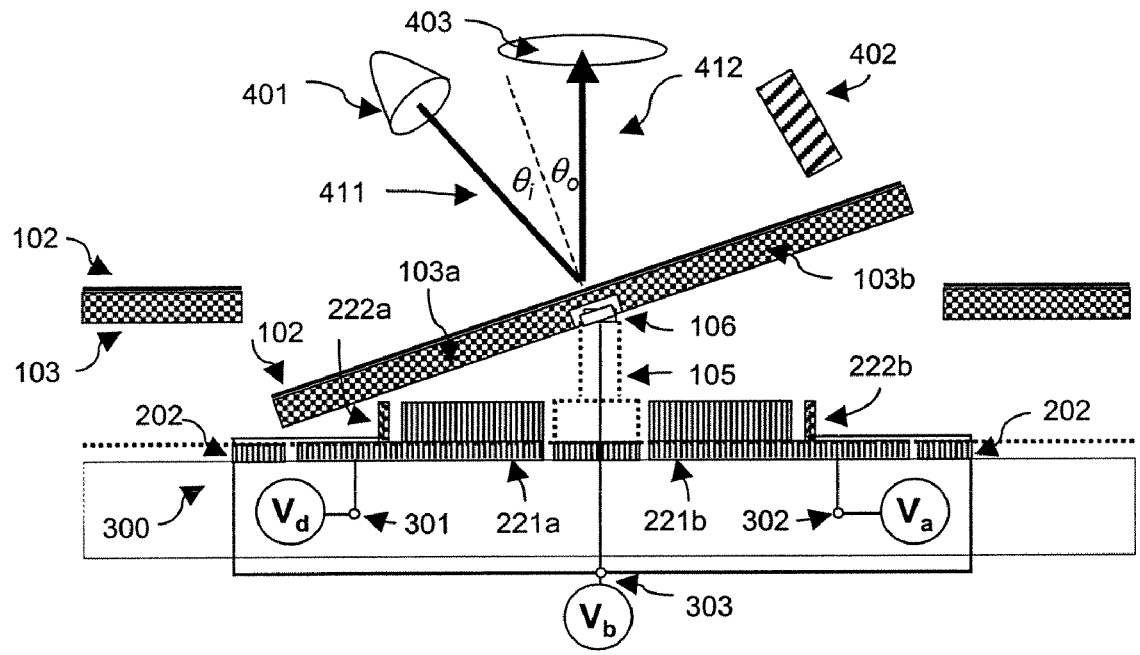
FIG. 1a illustrates a cross section view of a part of the spatial light modulator according to one embodiment of the present invention deflecting illumination to an "on" state.
Figure 1B:
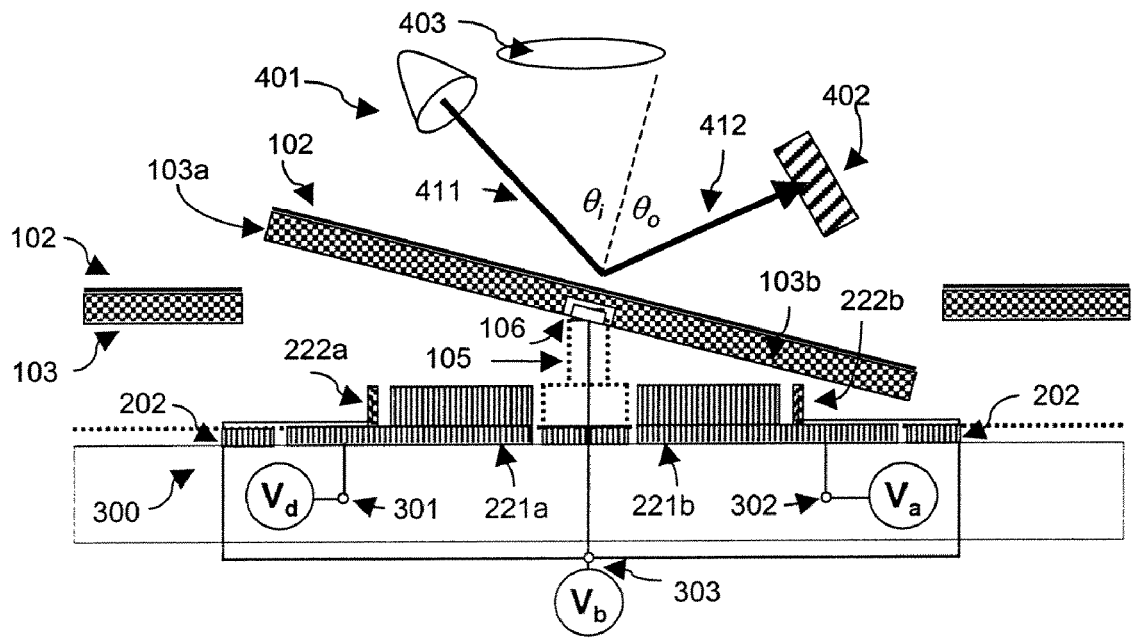
FIG. 1b illustrates a cross section view of a part of the spatial light modulator according to one embodiment of the present invention deflecting illumination to an "off" state.

A cross section view of a part of the spatial light modulator according to one embodiment of the present invention is shown in FIG. 1a, as the directional light 411 of illumination 401 at an angle of incidence θi is deflected 412 at an angle of θo toward normal direction of a micro mirror array. In a digital operation mode, this configuration is commonly called the "on" position. FIG. 1b shows a cross section view of the same part of the spatial light modulator while the mirror plate is rotated toward another electrode under the other side of the hinge 106. The same directional light 411 is deflected to 412 a much larger angles θi and θo predetermined by the dimensions of mirror plate 102 and the air gap spacing between its lower surfaces of mirror 103 to the landing tips 222, exits toward a light absorber 402.

According to another embodiment of the present invention, the high contrast SLM is consisted of three major portions. The bottom portion is a wafer substrate 300 with addressing circuitries to selectively control the operation of each mirror in the micro mirror array of SLM. The addressing circuitries comprise array of memory cells and word-line/bit-line interconnect for communication signals. The electrical addressing circuitry on a silicon wafer substrate may be fabricated using standard CMOS technology, and resembles a low-density memory array.

The middle portion of the high contrast SLM is formed by arrays of step electrodes 221, landing tips 222, hinge support posts 105, and a support frame 202.

The multi-level step electrodes 221 in present invention are designed to improve the capacitive coupling efficiency of electrostatic torques during the angular cross over transition. By raising the electrode 221 surfaces near the hinge 106 area, the air gap spacing between the mirror plate 103 and the electrodes 221 is effectively narrowed. Since the electrostatic attractive force is inversely proportional to the square of the distance between the mirrors and electrodes, this effect becomes apparent when mirror is tilted at its landing positions. When operating in analog mode, high efficient electrostatic coupling allows a more precise and stable control of the tilting angles of the individual micro mirror in the spatial light modulator. In a digital mode, it requires much lower driving voltage potential in addressing circuitry to operate. The height differences between the first level electrodes 221 to the second may vary from 0.2 microns to 3 microns depends on the relative height of air gap between the first level electrodes to the mirror plate.

On the surfaces of control substrate, a pair of stationary vertical landing tips 222a and 222b is designed to have same height as that of second level electrodes 221 for manufacturing simplicity. A pair of stationary vertical tips 222a and 222b has two functions. The vertical micro tips provide a gentle mechanical touch-down for the mirror to land on each angular cross over transition at a pre-determined angle precisely. Adding a stationary landing tip 222 on the surface of control substrate enhances the robotics of operation and prolongs the reliability of the devices. The second function of these vertical landing tips 222 is providing a mechanism to allow an ease of separation between the mirror 103 and its contact stop 222, which effectively eliminates the contact surface adhesion during a digital operation of SLM. For example, to initiate an angular cross over transition, a sharp bipolar pulse voltage Vb is applied on the bias electrode 303, typically connected to each mirror plate 103 through its embedded hinges 106 and support posts 105. The voltage potential established by the bipolar bias Vb enhances the electrostatic forces on both side of the hinge 106. This strengthening is unequal on two sides at the landing position, due to the large difference in air gap spacing. Though the increases of bias voltages Vb on the lower surface of mirror plate 103a and 103b has less impact on which direction the mirror 102 will rotate toward, a sharp increase of electrostatic forces F on the whole mirror plate 102 provides a dynamic excitation by converting the electro-mechanical kinetic energy into an elastic strain energy stored in the deformed mirror hinges 106 and deformed micro landing tips 222a or 222b. After a bipolar pulse is released on the common bias Vb, the elastic strain energy of deformed landing tip 222a or 222b and deformed mirror hinges 106 is converted back to the kinetic energy of mirror plate as it springs and bounces away from the landing tip 222a or 222b. This perturbation of mirror plate toward the quiescent state enables a much smaller address voltage potential Va for angular cross over transition of mirror plate 102 from one state to the other.

Hinge support frame 202 on the surface of control substrate 300 is designed to strengthen the mechanical stability of the pairs of mirror support posts 105, and retained the electrostatic potentials locally. For the simplicity, the height of support frames 202 is designed to be the same as the first level electrodes 221. With a fixed size of mirror plate 103, the height of a pair of hinge support posts 105 will determine the maximum deflection angles θ of a micro mirror array.

The upper portion of the high contrast SLM is fully covered by arrays of micro mirrors with a flat optically reflective layer 102 on the upper surfaces and a pair of embedded torsion hinges 106 under the cavities in the lower portion of mirror plate 103. Pair of torsion hinges 106 in the mirror plate 103 is fabricated to be part of the mirror plate 103 and are kept in a minimum distance under the reflective surface to allow only a gap for a pre-determined angular rotation. By minimizing the distances between a hinge rotating axes 106 to the upper reflective surfaces 102, the spatial light modulator effectively eliminates the horizontal displacement of each mirror during an angular transition. According to the present invention, the gaps between adjacent mirrors in the array of SLM can be reduced to less than 0.2 microns to achieve the highest active reflection area fill-ratio of a micro mirror array at the present time.

The materials for the mirror plate 103, embedded torsion hinges 106, and support posts 105 should be conductive and have sufficient strength to deflect without fracturing. Furthermore, all the materials used in constructing the micro mirror array have to be processed under 400° C., a typical manufacturing process temperature without damaging the pre-fabricated circuitries in the control substrate. The optical reflectivity may be enhanced by further depositing a layer of metallic thin-films 102, such as aluminum, gold, or their alloys depending on the applications on the surfaces of mirror plate 103.

The materials used for micro deflection devices are preferably conductive, stable, with suitable hardness, elasticity, and stress. Ideally a single material will cover both the stiffness of mirror plate 103 and plasticity of torsion hinges 106. According to another embodiment of the present invention, the materials of mirror plates 103, embedded torsion hinges 106, support frames 202, support posts 105 are made of polysilicon. Although polysilicon has its physical and chemical properties well suit for the application, other conductive materials such as doped silicon, silicide or polycide, or metals such as aluminum, titanium, tungsten, or molybdenum, their alloys and a combination thereof, are also suitable and desirable in some applications.

Figure 2:
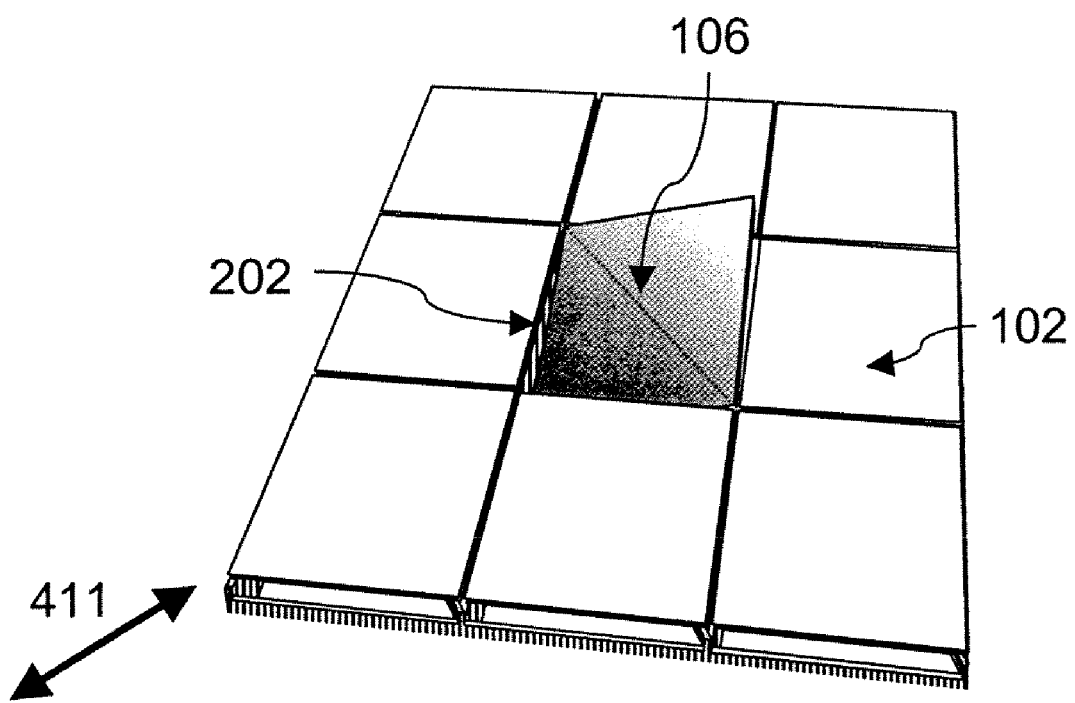
FIG. 2 is a perspective view showing the top of a part of the arrays of rectangular shape mirrors for a projection system with diagonal illumination configuration.

The solution to the diffraction problem is to weaken the intensity of diffraction pattern and to direct the scattered light from the inactive area of each pixel to different directions away from the projection pupil. One method is directing the incident light 411 45° to the edges of the square shape mirror 102 pixels, which sometimes called diagonal hinge or diagonal illumination configuration. FIG. 2 is a perspective view showing the top of a part of the mirror array with each mirror 102 having a square shape using a diagonal illumination system. The hinges 106 of mirror in the array are fabricated in diagonal direction along two opposite corners of the mirror and in perpendicular to the light of illumination 411. The advantage of a square shape mirror with a diagonal hinge axis is its ability to deflect the scattered light from the leading and trailing edges 45° away from the projection pupil 403. The disadvantage is that it requires the projection prism assembly system to be tilted to the edge of the SLM. The diagonal illumination has a low optical coupling efficiency when a conventional rectangular TIR prism system is used to separate the "on" and "off" light selected by each mirror 102. The twisted focusing spot requires an illumination larger than the size of rectangular micro mirror array surfaces in order to cover all active pixel arrays. A larger rectangular TIR prism increases the cost, size, and the weight of the projection display.

Figure 3:
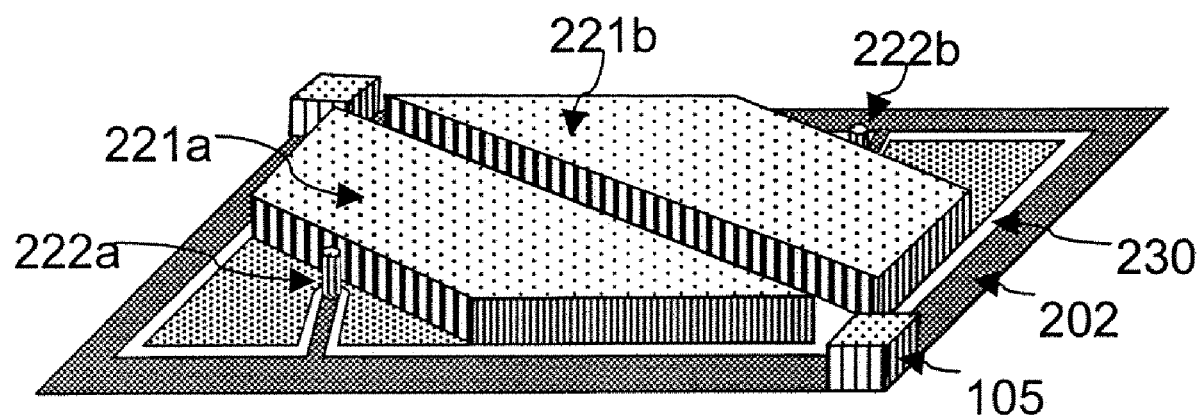
FIG. 3 is a perspective view showing the top of a part of the control circuitry substrate for a projection system with diagonal illumination configuration.

A perspective view of the top of a part of the control circuitry substrate for the projection system with diagonal illumination light configuration is shown in FIG. 3. The pair of step electrodes 221 is arranged diagonal accordingly to improve the electrostatic efficiency of the capacitive coupling to the mirror plate 103. The two micro tips 211a and 211b act as the landing stops for a mechanical landing of mirrors 103 to ensure the precision of tilted angle θ and to overcome the contact stiction. Made of high spring constant materials, these micro tips 222a and 222b act as landing springs to reduce the contact area when mirrors are snap down. Second function of these micro tips 222 at the edge of two-level step electrodes 221 is their spring effect to separate itself from the mirror plates 103. When a sharp bipolar pulse voltage potential Vb is applied on the mirror 103 through a common bias 303 of mirror array, a sharp increase of electrostatic forces F on the whole mirror plate 103 provides a dynamic excitation by converting the electromechanical kinetic energy into an elastic strain energy stored in the deformed mirror hinges 106. The elastic strain energy is converted back to the kinetic energy of mirror plate 103 as it springs and bounces away from the landing tip 222. This perturbation of mirror plate 103 toward the quiescent state enables a much smaller address voltage potential Va for angular cross over transition of mirror plate 103 from one state to the other.

Figure 4:
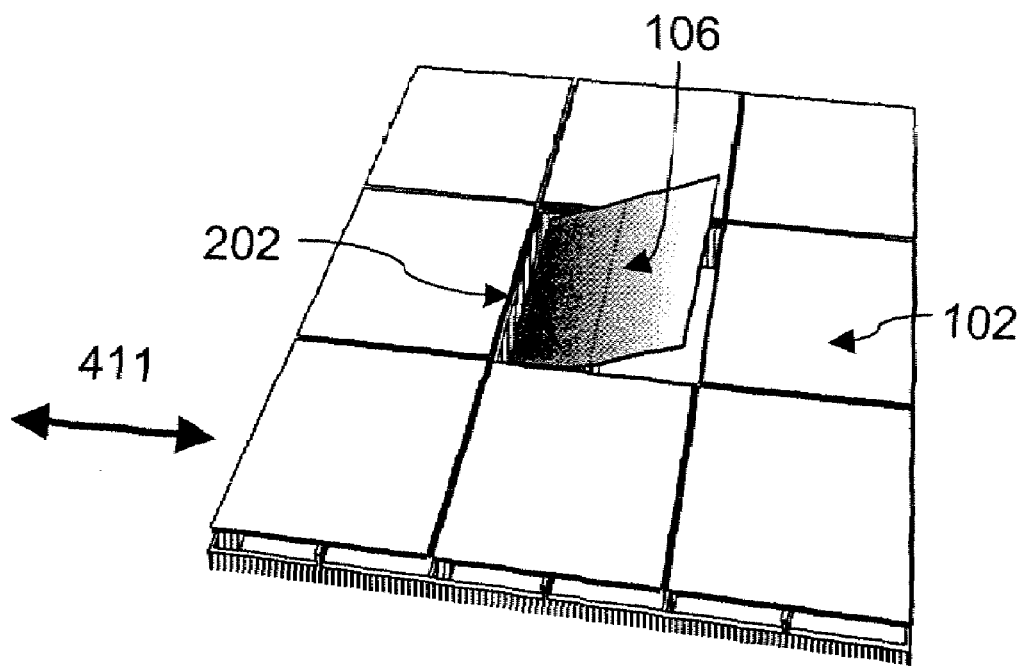
FIG. 4 is a perspective view showing the top of a part of the arrays of rectangular shape mirrors for a projection system with orthogonal illumination configuration.

FIG. 4 shows a perspective view of the top of a part of mirror array with rectangular shape mirrors for the projection system with orthogonal illumination configuration. The embedded torsion hinges 106 are in parallel to the leading and trailing edges of mirror and in perpendicular to the light of illumination 411. So the mirror pixels in the SLM are illuminated orthogonally. Orthogonal illumination has a higher optical system coupling efficiency, and requires a less expensive, smaller size, and lighter TIR prism. However, since the scattered light from both leading and trailing edges of mirror is scattered straightly into the projection pupil 403, it creates a diffraction patterns reducing the contrast ratio of a SLM.

Figure 5:
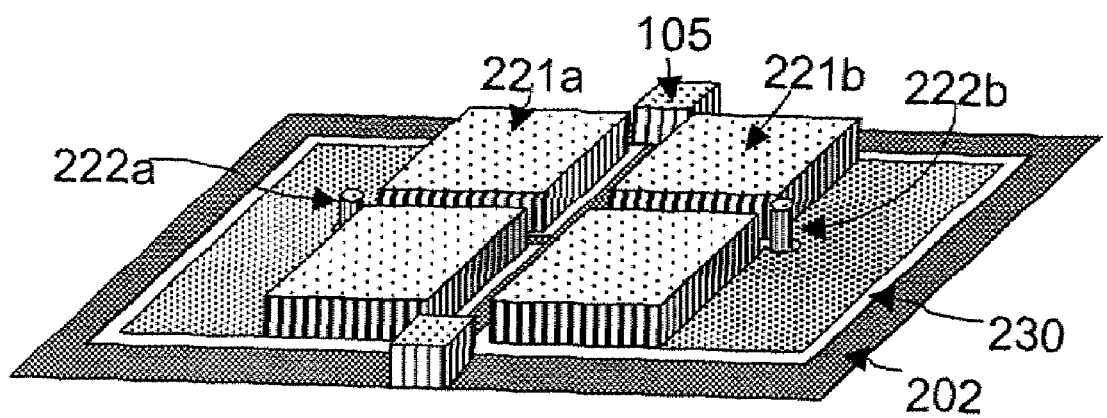
FIG. 5 is a perspective view showing the top of a part of the control circuitry substrate for a projection system with orthogonal illumination configuration.

FIG. 5 is a perspective view showing the top of a part of the control circuitry substrate 300 for the projection system with orthogonal illumination light 411 configuration. With a two-level step electrodes 221 configuration, the average effective air gap spacing between the mirror plate 103 and the underneath electrode 211 is significantly narrowed. The micro tips 222 at the edge of step electrodes 221 act as landing tips to further overcome the contact surface adhesion. This low voltage driven and high efficiency micro mirror array design allows an operation of a larger total deflection angle ($|\theta|>15°$) of micro mirrors to enhance the brightness and contrast ratio of the SLM.

Figure 6:
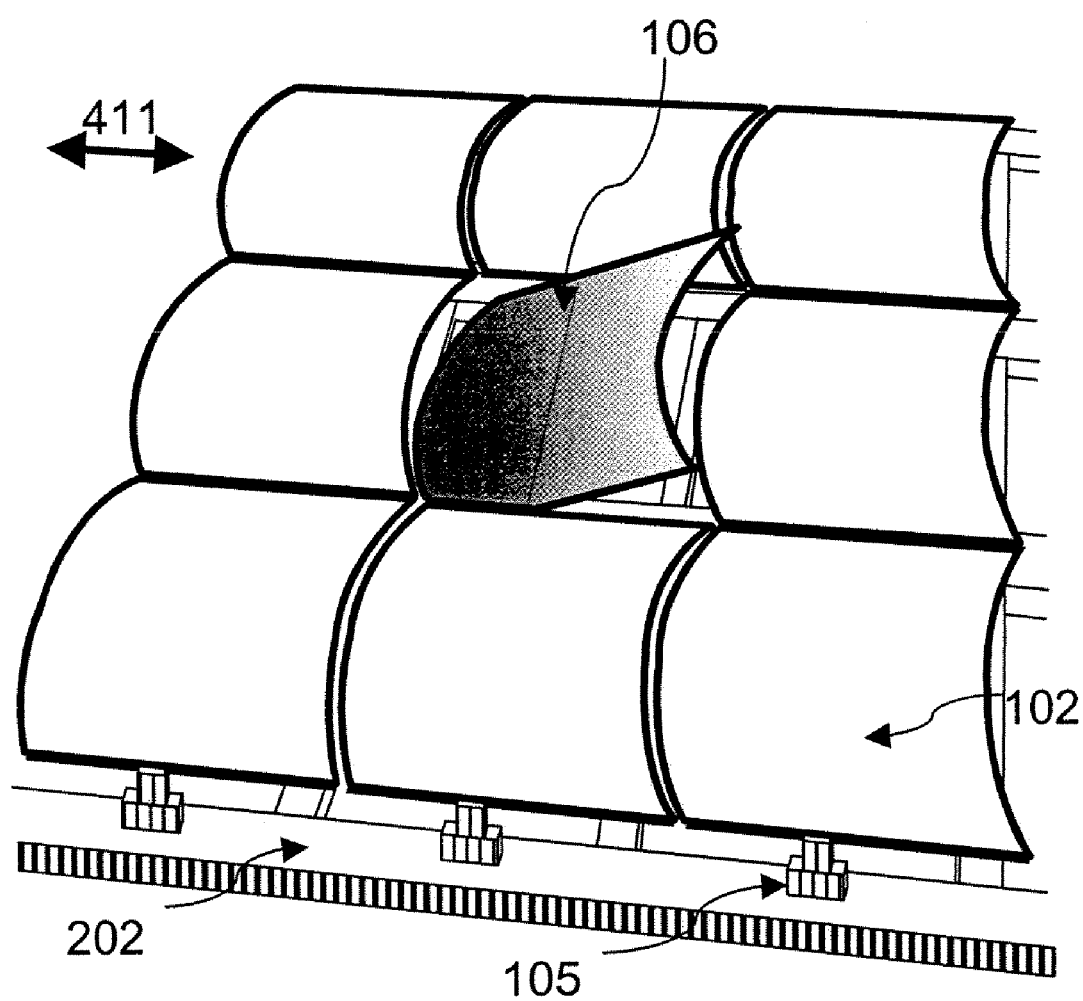
FIG. 6 is a perspective view showing the top of a part of the mirror arrays with curvature leading and trailing edges of each mirror for a projection system with orthogonal illumination configuration.

The periodic array of the straight or corner shape edges of mirror in a SLM creates a diffraction patterns tended to reduce the contrast of projected images by scattering the illumination 411 at a fixed angle. A curvature shape leading and trailing edges of mirror in the array generates much weaker diffraction patterns due to the variation of scattering angles of the illumination 411 on the edges of mirror. According to another embodiment of the present invention, the reduction of the diffraction intensity into the projection pupil 403 while still maintaining an orthogonal illumination optics system is achieved by replacing the straight or fixed angular corner shape edges of a rectangular shape mirror with at least one or a series curvature shape leading and trailing edges with opposite recesses and extensions. Forming a curvature in the leading and trailing edges that is in perpendicular to the incident illumination 411 weakens the diffraction intensity and reduces a large portion of scattering light diffracted directly into the projection system. FIG. 6 is a perspective view showing the top of a part of the mirror array with curvature leading and trailing edges. The radius curvature of leading and trailing edges of each mirror r may vary between half to a full width of the rectangular mirror pixel sides a. In this case, the mirror is a square with a leading and trailing curvature opposite in recesses and extensions. The radius of curvature r is equal to the width of square mirror pixels a. Smaller radius r has a more significant impact in intensity reduction of diffraction patterns, but a curvature with a radius r smaller than ¾ of the side of mirror pixel a may become visible as it approaching to half of the width of square a.

Figure 7:
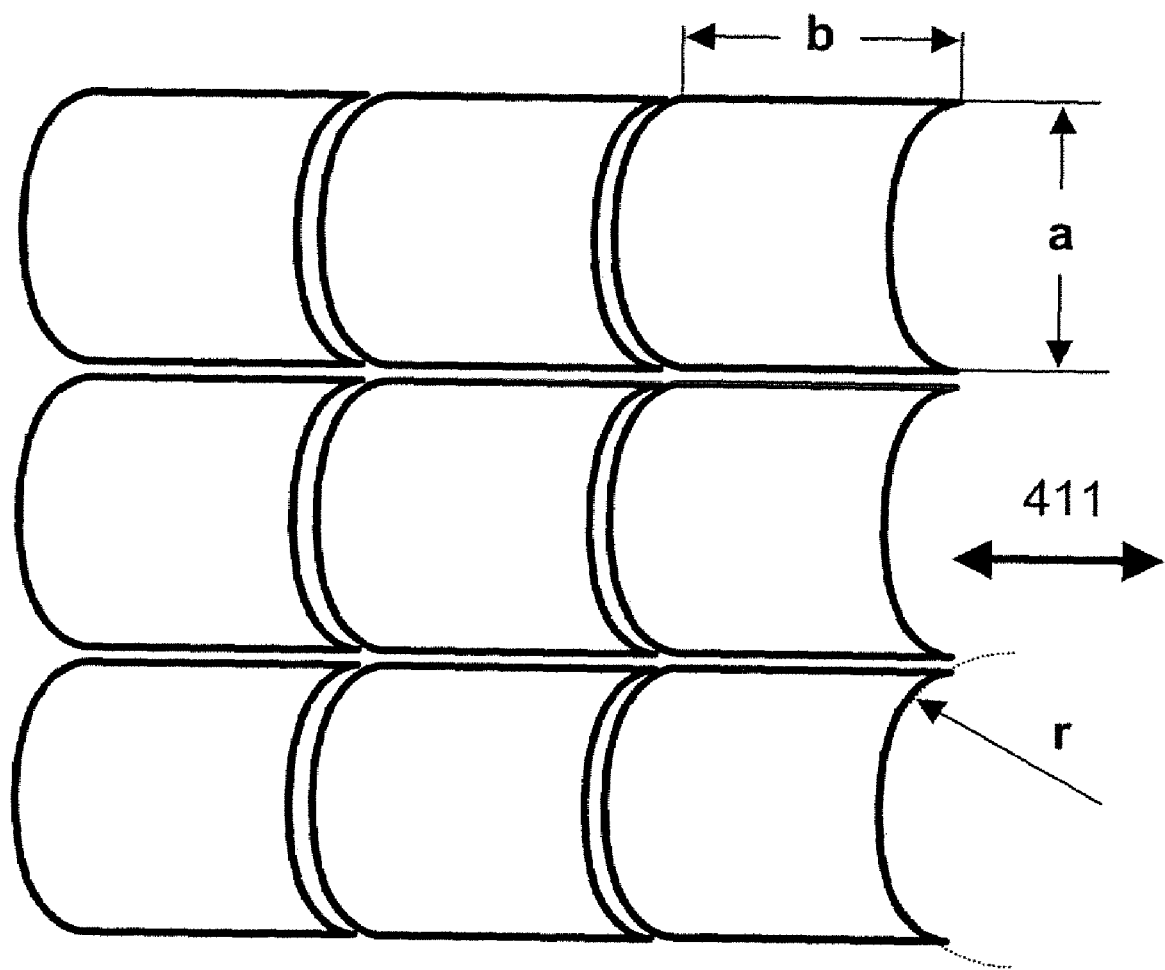
FIG. 7 is an enlarged top view of a part of the mirror array with each mirror having a curvature leading and trailing edge for a projection system with orthogonal illumination configuration.

Another advantage of this reflective spatial light modulator is that it produces the highest possible active reflection area fill-ratio by embedding the torsion hinge 106 under the cavities in the lower portion of mirror plate 103, which almost completely eliminates the horizontal displacement of mirror 103 during an angular cross over transition. The embedded torsion hinge 106 in each mirror 103 allows a highest closely packed mirror array available without worrying the horizontal displacement during angular cross over transition. FIG. 7 is an enlarged top view of a part of the mirror array with each mirror having a curvature in the leading and trailing edges. In one of the present invention, mirror pixel size (a×b) is about 10 microns×10 microns, while the radius of curvature r is also 10 microns.

Figure 8:
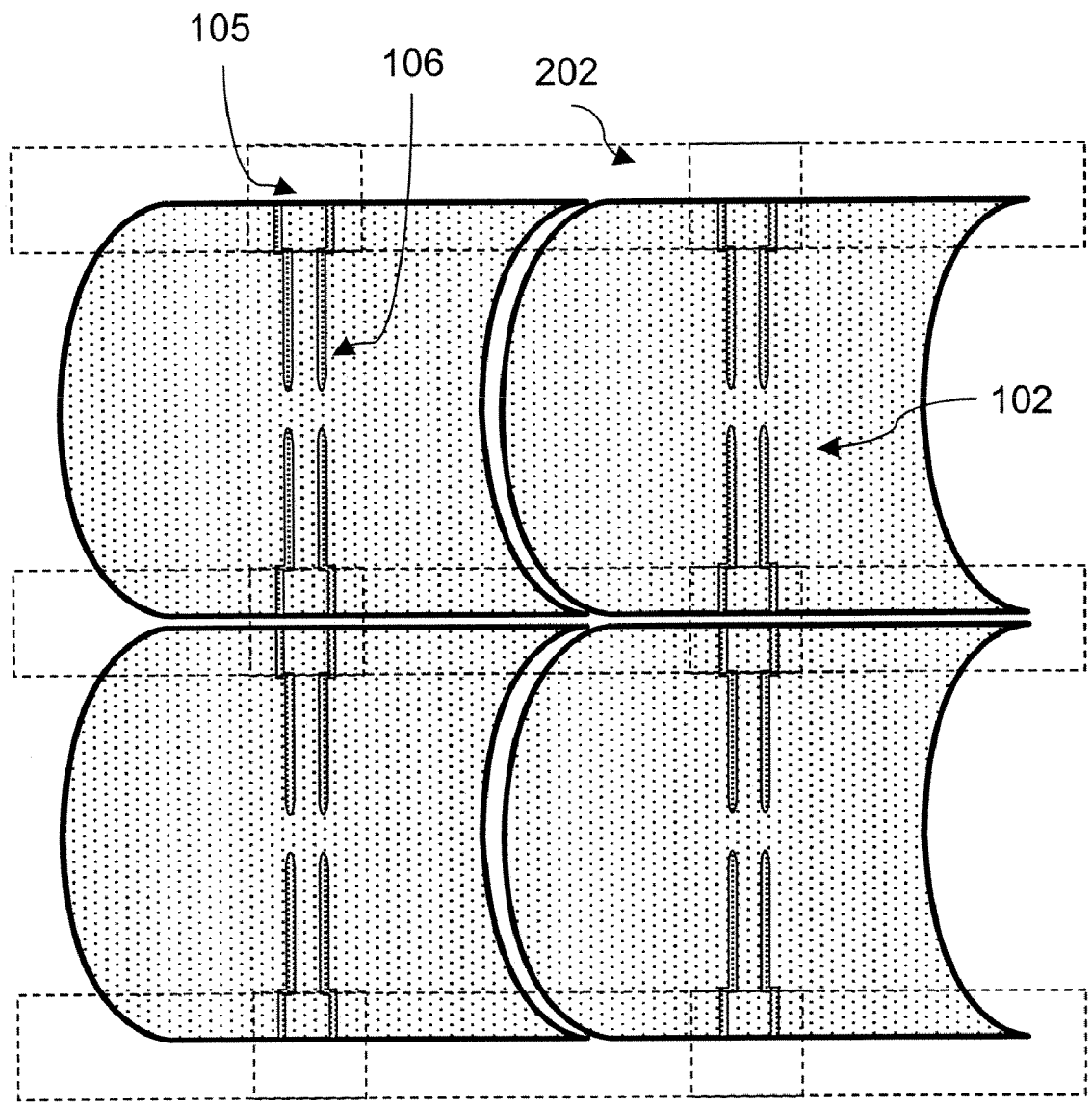
FIG. 8 is an enlarged backside view of a part of the mirror array with each mirror having a curvature leading and trailing edges for a projection system with orthogonal illumination light configuration.

FIG. 8 is an enlarged view of a part of the backside of the mirror array with each mirror having curvature in the leading and trailing edges. The torsion hinges 106 are clearly presented embedded under the cavities and as part of the mirror plate 103, and supported by a pair of support posts 105 on top of support frames 202. The dimension of hinges 106 varies depending on the size of the mirrors 102. At present invention, the dimension of each torsion hinge 106 is about 0.1×0.2×3.5 microns, while the support post 105 has a square shape cross section with each side W about 1.0 micron width. Since the top surfaces of support posts 105 are also under the cavities as lower part of the mirror plate 103, the air gap G in the cavity needs to be high enough to accommodate the angular rotation of mirror plate 103 without touching the larger hinge support posts 105 at a pre-determined angle θ. In order for the mirror to rotate a pre-determined angle θ without touching the hinge support post 105, the air gap of the cavities where torsion hinges 106 are embedded must be larger than $G=0.5 \times W \times SIN(\theta)$, where W is the cross section width of hinge support posts 105.

Figure 9:
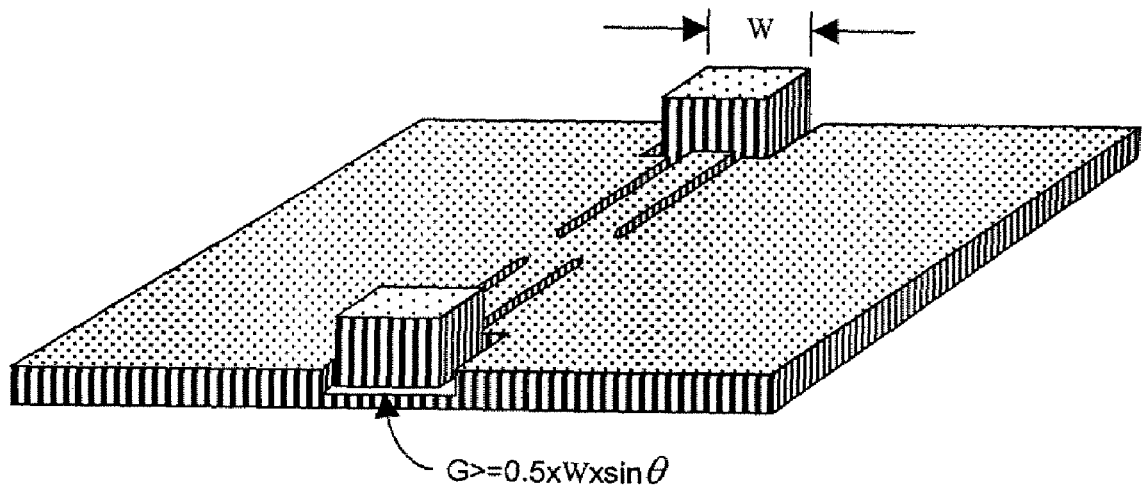
FIG. 9 is a perspective view showing the embedded torsion hinges and their support posts under the cavities in the lower portion of a mirror plate.
Figure 10:
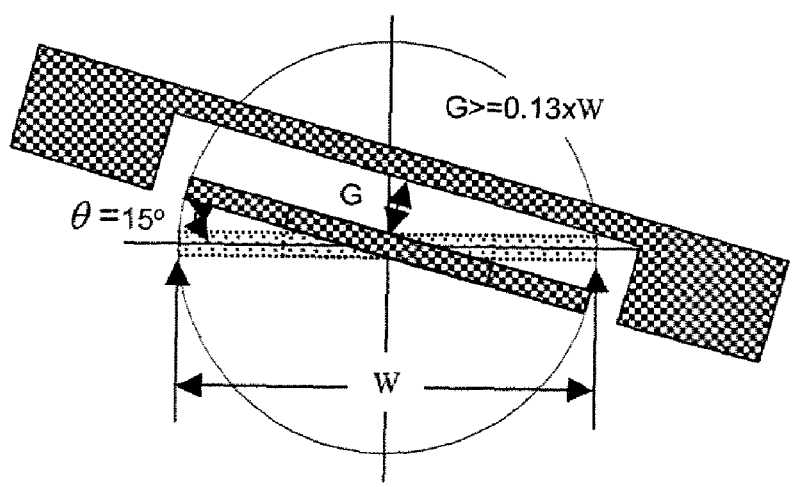
FIG. 10 is a diagram illustrates a minimum air gap spacing around the embedded torsion hinge of a mirror plate when rotated 15° in one direction.

FIG. 9 illustrates a perspective view of a part of backside mirror in the array showing the embedded torsion hinges 106 and their support posts 105 under the cavities in the lower portion of a mirror plate 103. To achieve optimum performance, it is important to maintain a minimum air gap G in the cavity where the embedded torsion hinges 106 are created. FIG. 10 is a diagram illustrates a minimum air gap spacing G around the embedded torsion hinge 106 of a mirror plate 103 when rotated 15° in one direction. The calculation indicates the air gap spacing G of torsion hinge 106 in the cavity must be larger than G=0.13W. If width of each side W of a square shape hinge support post 105 is 1.0 micron, the air gap spacing G in the cavity should be larger than 0.13 microns. Without horizontal displacement during the angular transition operation, the horizontal gap between the individual mirrors in the micro mirror array may be reduced to less than 0.2 microns, which led to a 96% active reflection area fill-ratio of the SLM according to the present invention.

Figure 11:
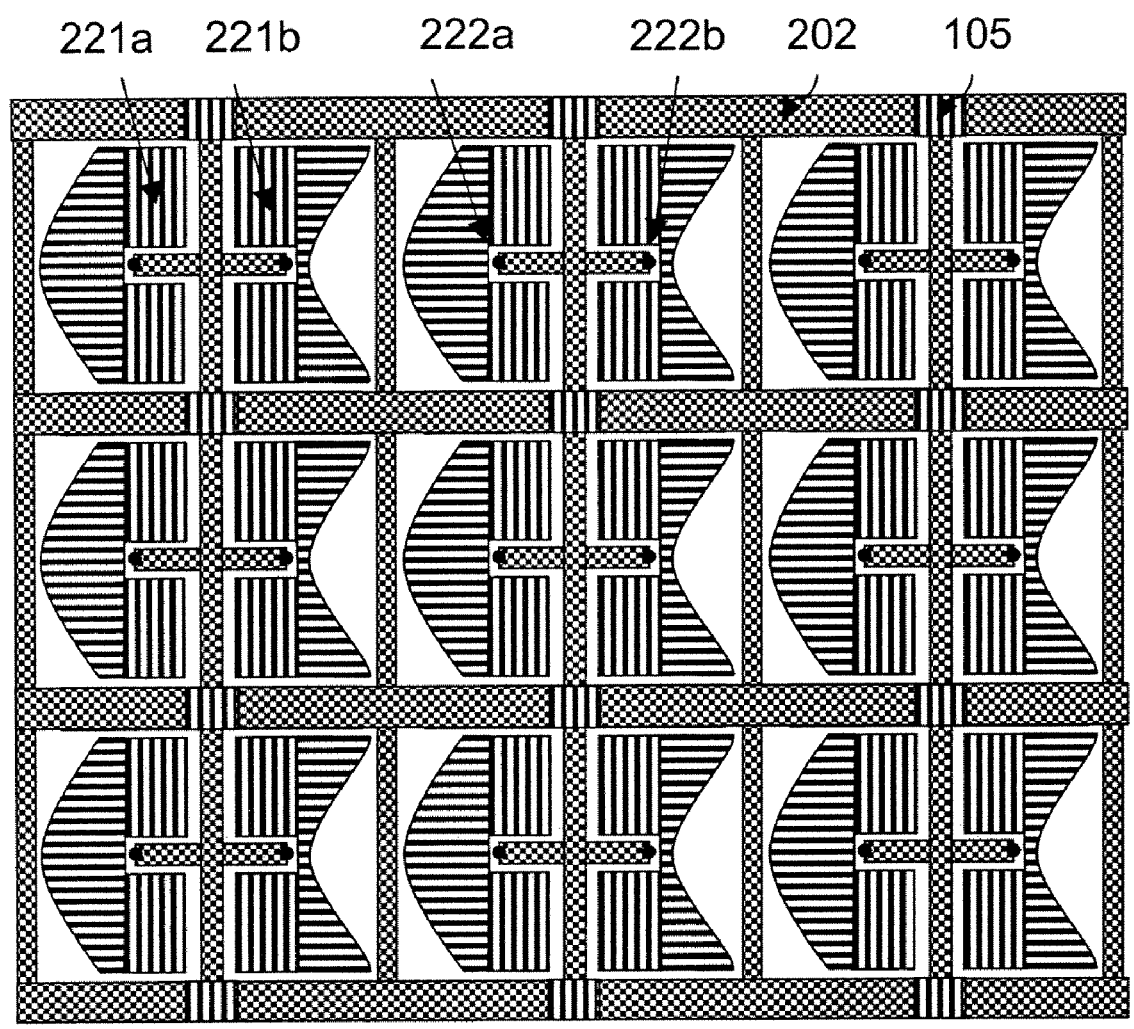
FIG. 11 is a perspective top view of a part of the surfaces of control circuitry substrate for a projection system with orthogonal illumination light configuration.

FIG. 11 shows a top view of a part of control substrate for the curvature leading and trailing edges mirror plate 102 with arrays of two-level step electrodes 221, the landing tips 222, and the hinge support posts 105 on the surfaces of control substrate 300. The curvature shape of first level electrodes 221 are designed to enhance the electrostatic efficiency of capacitive coupling of mirror plate 103. However, the shape of first level electrodes 221 should be modified if other shape of mirror 102 is adapted for the application. Unlike conventional flat electrodes, the two-level step electrodes 221 raised above the surface of control substrate 300 near the hinge axis narrows the effective air gap spacing between the flat mirror plate 103 and the bottom electrodes 221. The number of levels for the step electrodes 221 can be varying from one to ten. However, the larger the number of levels for step electrodes 221 the more complicated and costly it takes to manufacture the devices. A more practical number would be from two to three. FIG. 10 also shows the mechanical landing stops made of micro tips 222 oriented in perpendicular to the surface of control substrate 300. These tips 222 provide a mechanical stop during the landing operation of angular cross over transitions.

Figure 12:
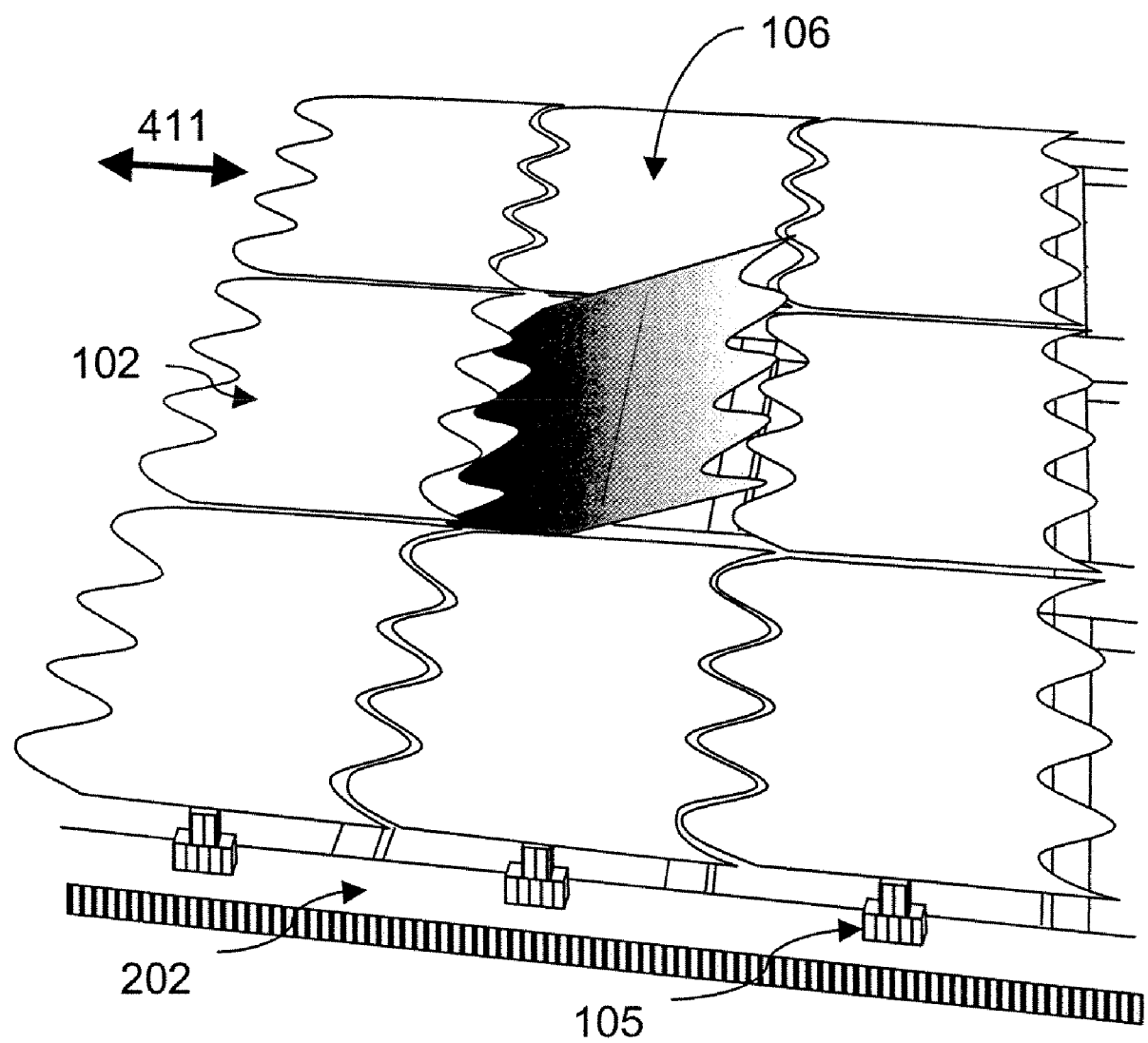
FIG. 12 is a perspective view showing the top of a part of the mirror array with each mirror having a series of curvature shapes leading and trailing edges for a projection system with orthogonal illumination configuration.

FIG. 12 is a perspective view showing the top of a part of the mirror array with each mirror surface having a series of curvatures in the leading edge extension and trailing edge recession. The principle is that a curvature edge weakens the diffraction intensity of scattered light and it further diffracts a large portion of scattered light at a variation of angles away from the optical projection pupil 403. As the radius of curvature r becomes smaller, the diffraction reduction effect becomes more prominent. To maximize the diffraction reduction effects, according to another embodiment of the present invention, a series of small radius curvatures r are designed to form the leading and trailing edges of each mirror in the array. The number of curvatures may vary depending on the size of mirror pixels, with a 10 microns size square mirror pixel, two to four curvatures on each leading and trailing edges provides an optimum results an low diffraction and within current manufacturing capability.

Figure 13:
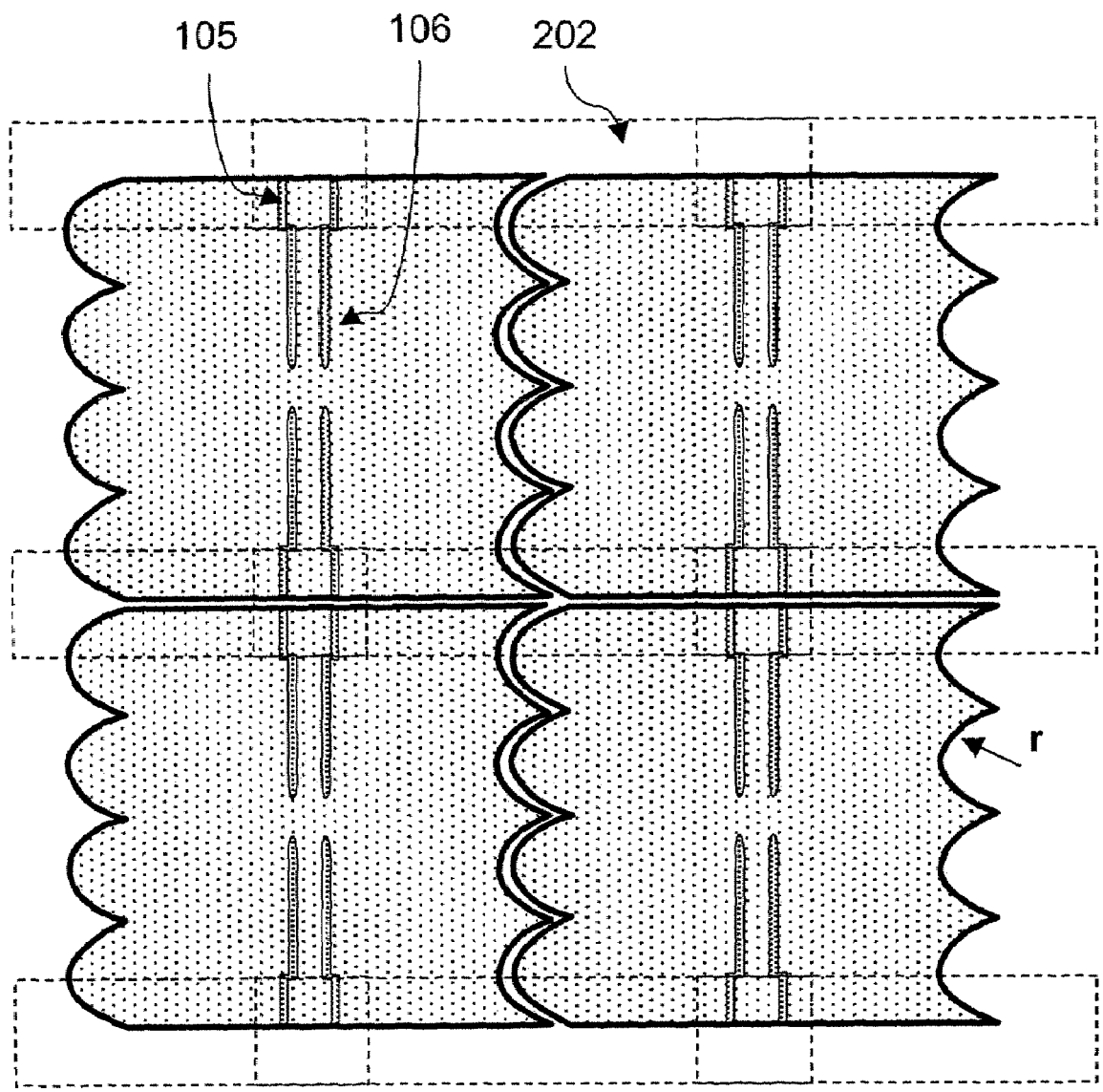
FIG. 13 is an enlarged backside view of a part of the mirror array with each mirror having a series of curvature shapes leading and trailing edges for a projection system with orthogonal illumination configuration.

An enlarged top view of a part of the backside of the mirror array designed to reduce diffraction intensity using four-curvature leading and trailing edges is shown in FIG. 13. Again, pairs of torsion hinges 106 are embedded in two cavities as part of the mirror lower portion 103. A pair of hinge support post 105 has a width W in the cross section much larger than the width of torsion hinge bar 106. Since the distance between the axis of hinge 106 to the reflective surfaces of mirror is kept minimum, a high active reflection area fill-ratio is achieved by closely packed individual mirror pixels without worrying the horizontal displacement.

Figure 14:
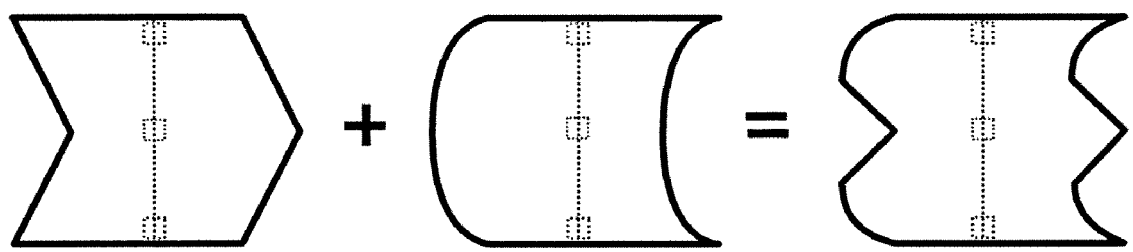
FIG. 14 is a diagram to illustrate the superimposing of a corner edged mirror to a curvature edged mirror to obtain a combined corner-flanked-by-curvatures shape leading and trailing edges of mirror surfaces.
Figure 15:
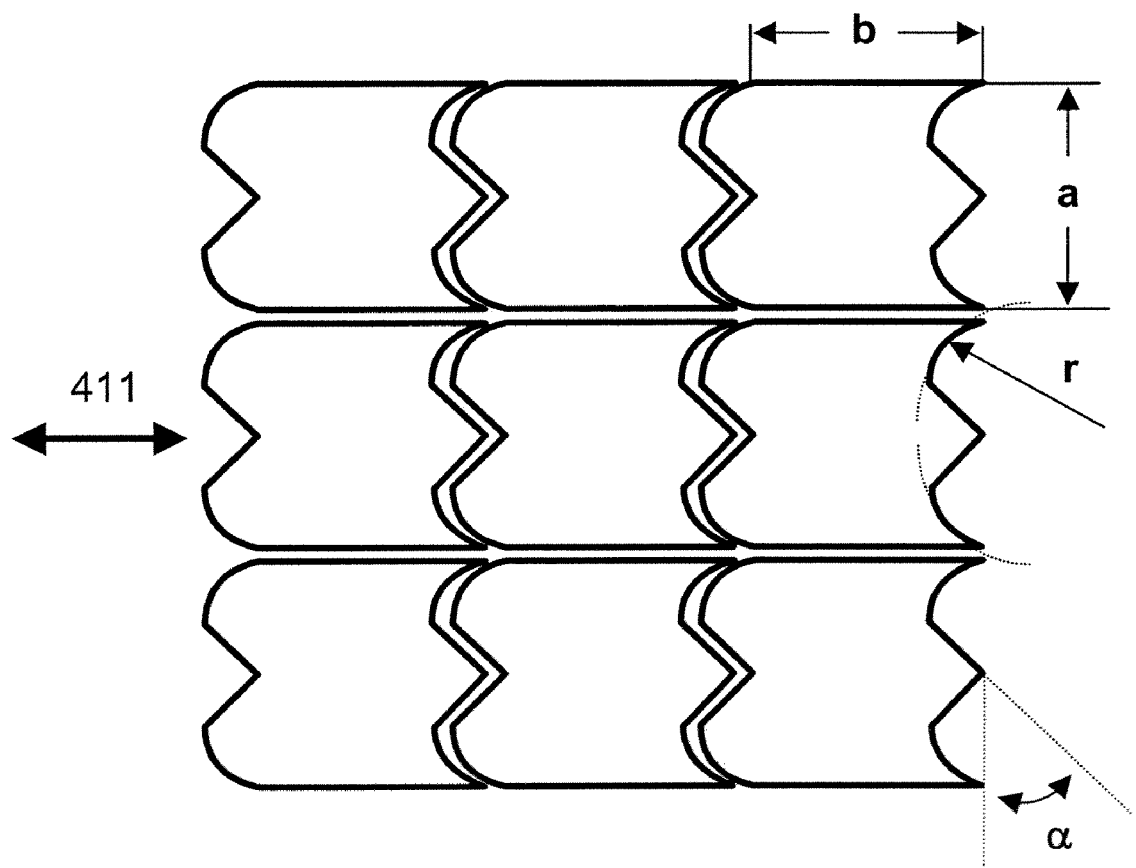
FIG. 15 is an enlarged top view of a part of the mirror array with each mirror having a corner-flanked-by-curvatures shape leading and trailing edges for a projection system with orthogonal illumination configuration.

In a mirror array with each mirror having a curvature leading and trailing edges, a large portion of diffraction intensity is eliminated as the illumination is scattered at a variable angles along the curvature line. However, there is still a small portion of scattered light is diffracted by the center portion of the curvatures in the mirror array. According to another embodiment of the present invention, the diffraction intensity is further reduced by superimposing a corner shape edge with a curvature edge to form a combined corner-and-curvature shape leading and trailing edges of mirror plate, as shown in FIG. 14. By replacing the center portion of the edges near straight section of the curvature with a said 45° angular corner, a significant reduction in diffraction intensity in the projection system 403 is obtained. FIG. 15 is an enlarged top view of a part of the mirror array designed by combining two best portion of corner shape with curvature shape to form a corner-and-curvature shape leading and trailing edges of mirror plate. Since the illumination is directed either 45° on the center angular corner portion or a varied angles along the both side curvature portion, the scattered light from the leading and trailing edges of mirror plate is significantly weakened and diffracted away from the projection pupil 403. Again, by closely packed, a high contrast spatial light modulator with minimum diffraction of scattered illumination is achieved.

Figure 16:
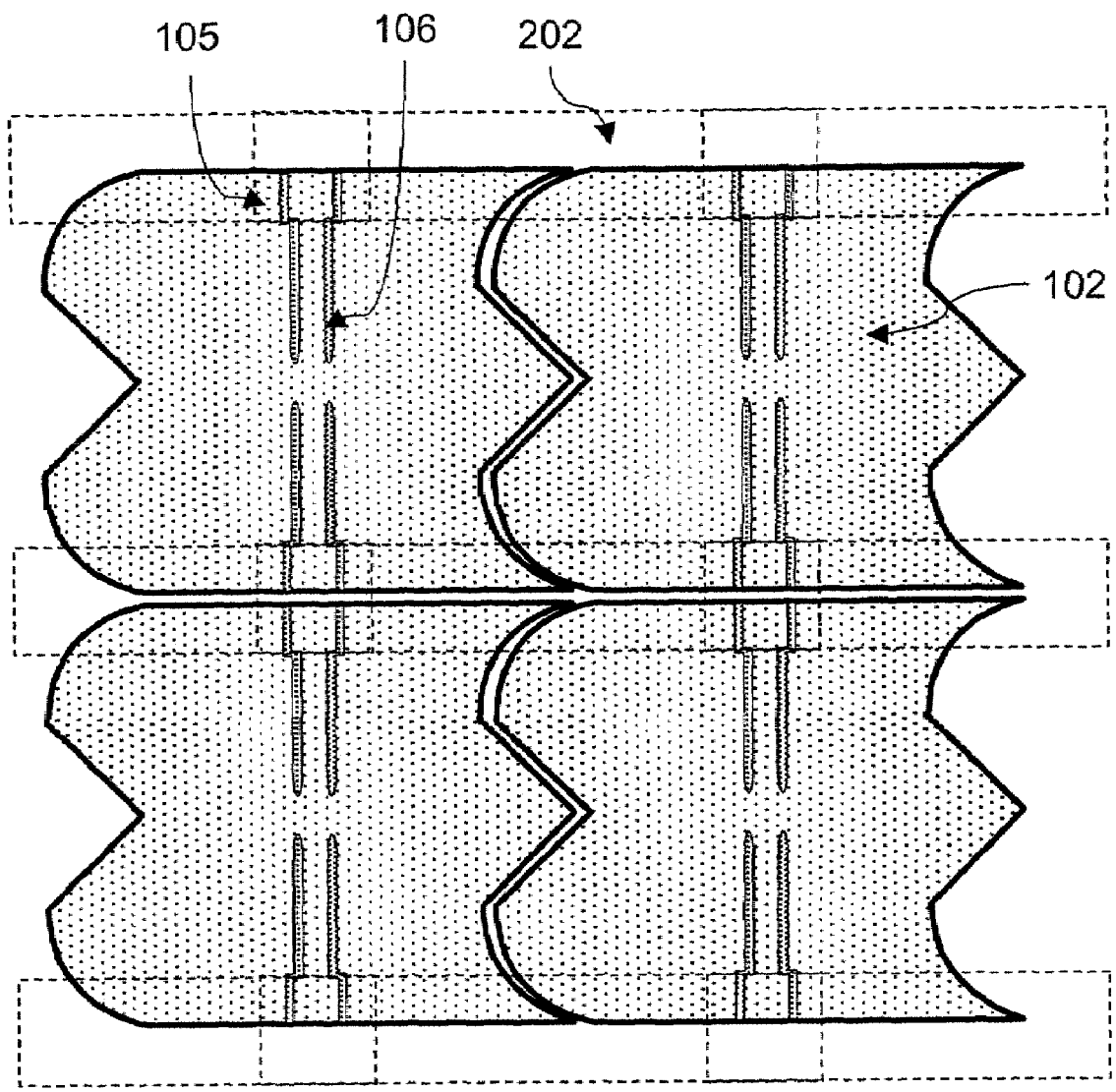
FIG. 16 is an enlarged backside view of a part of the mirror array with each mirror having a corner-flanked-by-curvatures shape leading and trailing edges for a projection system with orthogonal illumination configuration.

FIG. 16 is an enlarged view of the backside of a part of the mirror array with each mirror having a corner-flanked-by-curvatures shape in the leading edge extension and trailing edge recession. The corner-flanked-by-curvatures shape mirror pixels are packed closely as described. These and other advantages will become apparent to those skilled in the art after consideration of the ensuing drawings and detailed description.

Although the invention has been particularly shown and described with reference to multiple embodiments, it will be understood by persons skilled in the relevant art that various changes in form and details can be made therein without departing from the spirit and scope of the invention.

Aside from video displays and printings, the spatial light modulator described here is also useful in other applications, such as in maskless photolithography, where the spatial light modulator directs light to develop deposited photoresist, and in photonic switch, where the optical signals are directed and distributed among fiber optical networks.

What is claimed is:

1. A spatial light modulator, comprising:
   a substrate having a plurality of electrodes;
   a mirror plate suspended over the plurality of electrodes, the mirror plate having an upper reflective surface and a lower surface, the mirror plate having an upper layer and a lower layer, the upper layer formed of a highly reflective material and the lower layer having a different composition from the upper layer;
   a support post on the substrate; and
   a torsion hinge connecting the support post to the mirror plate, the torsion hinge positioned in the recess of the mirror plate and permitting the mirror plate to rotate about an axis of the torsion hinge;
   wherein the lower layer includes doped silicon and an aluminum alloy.

2. The spatial light modulator of claim 1, wherein the support post is formed of doped silicon.

3. The spatial light modulator of claim 1, wherein the torsion hinge is formed of doped silicon.

4. The spatial light modulator of claim 1, wherein the doped silicon is conductive.

5. The spatial light modulator of claim 1, wherein the reflective material includes aluminum or gold.

6. The spatial light modulator of claim 1, wherein the lower surface is a surface of the lower layer.

7. The spatial light modulator of claim 1, wherein the torsion hinge is part of a lower portion of the mirror plate and is kept a minimum distance under the reflective surface to allow only a gap for a pre-determined angular rotation.

8. The spatial light modulator of claim 1, wherein the torsion hinge is along an axis perpendicular to a side edge of said mirror plate.

9. The spatial light modulator of claim 1, wherein the torsion hinge is along an axis at an acute angle to a side edge of said mirror plate.

10. The spatial light modulator of claim 1, wherein the substrate is a semiconductor control substrate.

11. The spatial light modulator of claim 10, wherein an electrode of the plurality of electrodes on the control substrate is electrically connected to the lower layer through the torsion hinge and the support post.

12. The spatial light modulator of claim 1, wherein an electrode of the plurality of electrodes is a step electrode raised above the surface of the substrate.

13. The spatial light modulator of claim 1, wherein the substrate further comprises at least one landing tip oriented perpendicular to the surface of the substrate and on one side of the hinge to stop mirror plate rotation.

14. The spatial light modulator of claim 13, wherein the lower surface of the mirror plate is electrically connected to the landing tip on the substrate through the torsion hinge and the support post.

15. An array of spatial light modulators of claim 1, wherein the array has a 96% active reflection area fill-ratio.

16. The array of claim 15, wherein the mirror plates are each 10 microns by 10 microns.

* * * * *